(12) United States Patent
Tang et al.

(10) Patent No.: US 12,145,137 B2
(45) Date of Patent: Nov. 19, 2024

(54) DLM-1 MOLECULAR SIEVE, PROCESS FOR PREPARING THE SAME, AND USE THEREOF

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Zhaoji Tang, Liaoning (CN); Hongfei Fan, Liaoning (CN)

(73) Assignees: CHINA PETROLEUM & CHEMICAL CORPORATION, Beijing (CN); SINOPEC Dalian Research Institute of Petroleum and Petrochemicals Co., Ltd., Liaoning (CN)

( * ) Notice: Subject to any disclaimer, the term of this patent is extended or adjusted under 35 U.S.C. 154(b) by 185 days.

(21) Appl. No.: 17/757,998

(22) PCT Filed: Dec. 24, 2020

(86) PCT No.: PCT/CN2020/139112
§ 371 (c)(1),
(2) Date: Jun. 24, 2022

(87) PCT Pub. No.: WO2021/129760
PCT Pub. Date: Jul. 1, 2021

(65) Prior Publication Data
US 2023/0025198 A1  Jan. 26, 2023

(30) Foreign Application Priority Data
Dec. 25, 2019 (CN) .................. 201911355108.1

(51) Int. Cl.
*B01J 29/00* (2006.01)
*B01J 29/04* (2006.01)
(Continued)

(52) U.S. Cl.
CPC ........... *B01J 29/044* (2013.01); *B01J 29/045* (2013.01); *B01J 35/647* (2024.01);
(Continued)

(58) Field of Classification Search
None
See application file for complete search history.

(56) References Cited

U.S. PATENT DOCUMENTS 9,776,177 B2 * 10/2017 Ng .......................... B01J 29/48

FOREIGN PATENT DOCUMENTS

CN  101269817 A  9/2008
CN  102992348 A  3/2013
(Continued)

OTHER PUBLICATIONS

Socci, Joseph et al.; "The catalytic cracking of sterically challenging plastic feedstocks over high acid density Al-SBA-15 catalysts"; Applied Catalysis A: General ; vol. 570; ISSN: 0926-860x; Nov. 24, 2018; pp. 218-227.
(Continued)

*Primary Examiner* — Stefanie J Cohen
(74) *Attorney, Agent, or Firm* — NKL Law; Allen Xue

(57) ABSTRACT

A DLM-1 molecular sieve, a process for preparing the molecular sieve, and use thereof in treating an organic substance are provided. The DLM-1 molecular sieve is an Al-SBA-15 molecular sieve, and has a schematic chemical composition as represented by the formula "first oxide*second oxide". The first oxide is silica, the second oxide is alumina, and the content by mass percent of alumina in the schematic chemical composition is 2% to 85%. The
(Continued)

DLM-1 molecular sieve is suitable for the hydrodenitrogenation reaction of heavy distillate oil, and is favorable for improving the hydrodenitrogenation activity.

6 Claims, 1 Drawing Sheet

(51) Int. Cl.
  B01J 35/64    (2024.01)
  B01J 37/00    (2006.01)
  B01J 37/02    (2006.01)
  C10G 45/08    (2006.01)
  C10G 45/12    (2006.01)
  C10G 47/20    (2006.01)
(52) U.S. Cl.
  CPC ....... *B01J 37/0009* (2013.01); *B01J 37/0203* (2013.01); *C10G 45/08* (2013.01); *C10G 45/12* (2013.01); *C10G 47/20* (2013.01)

(56) References Cited

FOREIGN PATENT DOCUMENTS

| CN | 103252256 | A  | 8/2013  |
| CN | 104016369 | A  | 9/2014  |
| CN | 104607160 | A  | 5/2015  |
| CN | 108187726 | A  | 6/2018  |
| CN | 108421556 | A  | 8/2018  |
| CN | 108946754 | A  | 12/2018 |
| KR | 101564404 | B1 | 10/2015 |

OTHER PUBLICATIONS

Dai, Yu et al.; "Influences of Al modification on the properties and catalytic performance of SBA-15 molecular sieves in hydrocracking", Journal of Fuel Chemistry and Technology, vol. 41, No. 12, Dec. 31, 2013, ISSN:0253-2409; pp. 1502-1506.

Vu, Xuan Hoan et al., "High-Temperature Synthesis of Ordered Mesoporous Aluminosilicates from ZSM-5 Nanoseeds with Improved Acidic Properties", Nanomaterials, vol. 4, Aug. 18, 2014, ISSN:2079-4991; pp. 712-725.

Han, Yu et al., "A Novel Method for Incorporation of Heteroatoms into the Framework of Ordered Mesoporous Silica Materials Synthesized in Strong Acidic Media", J. Phys. Chem. B, vol. 105, No. 33, Jul. 26, 2001, ISSN: 1520-6106; pp. 7963-7966.

Zhao, Dong Yuan, et al. "Triblock copolymer syntheses of mesoporous silica with periodic 50 to 300 angstrompores"; Science, vol. 279, No. 5350, Jan. 23, 1998, pp. 548-552.

Ungureanu, A. et al.; "Effect of aluminium incorporation by the "pH-adjusting" method on the structural, acidic and catalytic properties of mesoporous SBA-15"; Microporous and Mesoporous Materials; vol. 163; Nov. 2012; pp. 51-64.

Ngo Thi Thanh Hien et al., "Direct Synthesis of Al-B-SBA-15 and Its Application in Preparing of Bifunctional Platinum Catalyst for Hydrogenation of Tetralin"; Catalysis in Industry, vol. 11, No. 1; pp. 59-64, May 2019.

Gallo, Jean Marcel R. et al., "Physicochemical Characterization and Surface Acid Properties of Mesoporous [Al]-SBA-15 Obtained by Direct Synthesis"; American Chemical Society, vol. 26, No. 8; Mar. 18, 2010; pp. 5791-5800.

* cited by examiner

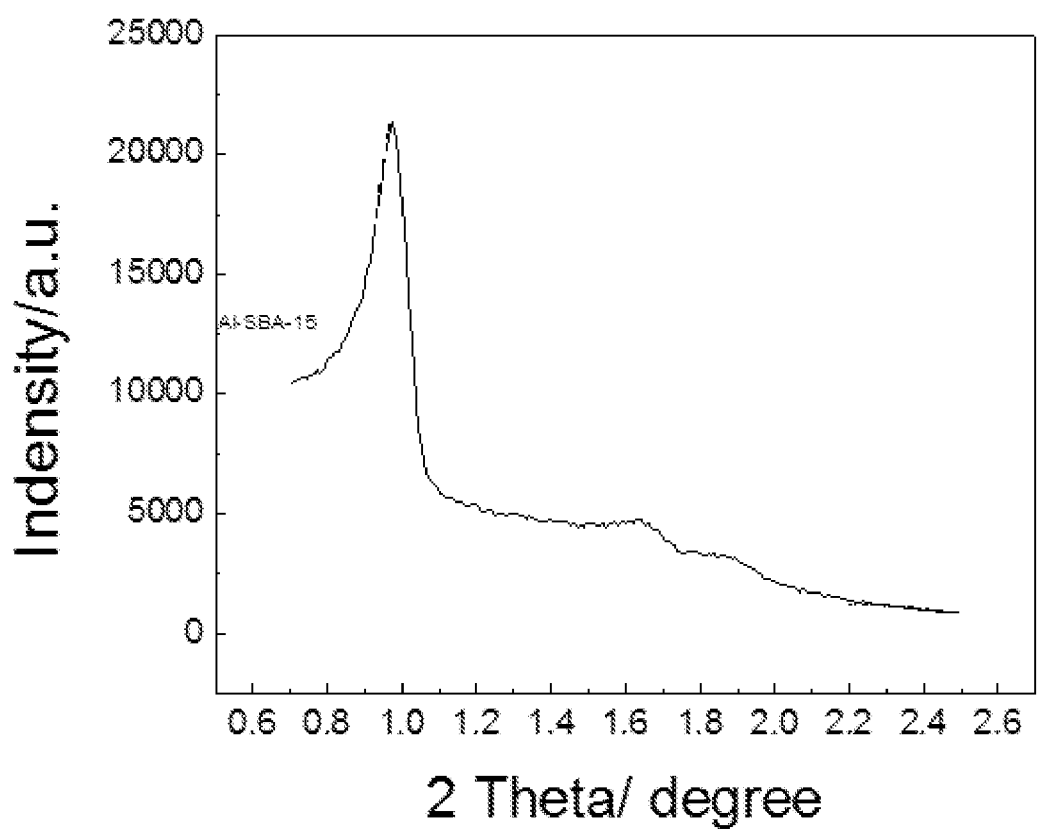

DLM-1 MOLECULAR SIEVE, PROCESS FOR PREPARING THE SAME, AND USE THEREOF

TECHNICAL FIELD

The present invention relates to a mesoporous molecular sieve, particularly a DLM-1 molecular sieve, belonging to Al-SBA-15 molecular sieve. The present invention also relates to the preparation process of the molecular sieve and its application in organic matter processing.

BACKGROUND TECHNOLOGY

According to the definition of the International Union of Pure and Applied Chemistry (IUPAC), a material with a pore diameter of 2-50 nm is a mesoporous material. In 1992, researchers from Mobil Company used alkyl quaternary ammonium salt as a template for the first time to synthesize the M41S series of silica-based mesoporous materials. At the end of the 20th century, Zhao DongYuan et al. (Zhao DongYuan, et al. Triblock copolymer syntheses of mesoporous silica with periodic 50 to 300 angstrompores [J]. Science, 1998, 279 (5350): 548-552.) firstly proposed the use of triblock copolymers (P123) is used as a template, and ethyl orthosilicate, methyl orthosilicate, and butyl orthosilicate are used as silicon sources to synthesize a new ordered $SiO_2$ mesoporous material, namely SBA-15 molecular sieve, in an acidic environment. It is a highly ordered planar hexagonal phase structure with two-dimensional hexagonal pores, the pore diameter is between 5 and 30 nm, the thickness of the pore wall is between 3 and 6 nm, and there are mesoporous materials connected with micropores between the pore channels, and a lot of silanol on the inner surface thereof.

SBA-15 molecular sieve is a pure silicon ordered mesoporous zeolite material with almost no acidity and poor stability, which limits its industrial application in the petrochemical field. The SBA-15 molecular sieve is usually modified by adopting a method of introducing the heteroatom(s), wherein the method of introducing the aluminum atom into the SBA-15 molecular sieve to synthesize the Al-SBA-15 molecular sieve is one of the most common modification methods.

Generally, there are two main methods for synthesizing the Al-SBA-15 molecular sieve, namely, a method of direct synthesis and aluminum supplementation and a method of post-treatment and grafting. In the direct synthesis method, in a strongly acidic synthesis medium, Al atoms mainly exist in a cationic form, and it is difficult for them to directly polymerize with silicon-hydroxyl species in the pore walls of SBA-15 to enter the skeleton thereof in a significant amount. Al atoms are not well dispersed in SBA-15, and mostly exist in an agglomerated form, so that the introduction efficiency of Al atoms in SBA-15 synthesized by the direct method is very low. Compared with the direct synthesis method, although the post-treatment grafting method can introduce a larger amount of Al atoms, however this synthesis method is relatively cumbersome, and it is easy to produce some alumina by-products inside or outside the pore channels of the material, resulting in the blockage of the pore channel of the material, and the significant reduction of the specific surface area and the pore volume, which becomes an unfavorable factor in the catalytic reaction.

CN104016369A discloses a process for preparing an Al-SBA-15 molecular sieve by using kaolin as raw material. CN108946754A discloses a process for preparing an aluminum-containing SBA-15 by using a residue from aluminum extraction with acid from a pulverized fuel ash as raw material. The above-mentioned processes firstly extract the silicon source and the aluminum source in the kaolin or the fly ash, and then use the extracted silicon/aluminum source as the synthesis raw material of the SBA-15 molecular sieve, so that on one hand, other impurities are easily introduced, and on the other hand, the defects of the conventional method of direct synthesis and aluminum supplementation still exist.

SUMMARY OF THE INVENTION

The inventors of the present invention have found that in the Al-SBA-15 molecular sieves made in the prior art, it is difficult for aluminum to enter the skeleton structure of the molecular sieve in significant amounts, or in order for the entry of a certain amount of aluminum into the skeleton of the molecular sieve, as cost, a greater amount of aluminum must be attached to the periphery of the skeleton of the molecular sieve (usually dispersed on the inner surface of the pore channels of the molecular sieve). Specifically, for the Al-SBA-15 molecular sieve manufactured according to the prior art, when the aluminum content is low (for example, the content by mass percent of alumina in the chemical composition of the molecular sieve is less than 7 wt %), this type of aluminum can still achieve a high degree of dispersion in the pore channels of the molecular sieve so that the molecular sieve exhibits a regular mesoporous structure as a whole, but as the aluminum content increases (for example, higher than 7 wt %, especially higher than 15 wt %), this type of aluminum begins to accumulate locally or completely on the pore channels of the molecular sieve, causing the pore channels of the molecular sieve to shrink rapidly (generally manifested as a rapid increase in the proportion of small pores with a pore diameter of less than 4 nm) or even block up, and the regularity of the mesoporous structure of the molecular sieve correspondingly decreases or even disappears completely. For this reason, the inventors of the present invention have discovered a DLM-1 molecular sieve through diligent research, and completed the present invention based on this discovery.

The present inventors found through the researches that the DLM-1 molecular sieve exhibits the XRD spectrum of the Al-SBA-15 molecular sieve, and belong to the Al-SBA-15 molecular sieve. Without being limited by any theory, the inventor of the present invention believes that in the DLM-1 molecular sieve of the present invention, aluminum basically enters the skeleton structure of the molecular sieve, so that even when the aluminum content is very high (for example, the content by mass percent of alumina in the chemical composition of the molecular sieve is higher than 7 wt %, even for example, up to 85% by weight), the molecular sieve still shows the regularity of the mesoporous structure. The regularity can generally be characterized by the pore distribution of the molecular sieve (especially the pore volume ratio of pores with a pore diameter of <4 nm). As evidence, according to the DLM-1 molecular sieve of the present invention, even if the content by mass percent of alumina in the chemical composition of the molecular sieve varies widely between 2% and 85%, the pore volume occupied by pores with a pore diameter of <4 nm is still less than 20% of the total pore volume, maintaining the integrity and regularity of the mesoporous structure, which is not available in the Al-SBA-15 molecular sieve manufactured by the prior art. Therefore, the DLM-1 molecular sieve of the present invention is an Al-SBA-15 molecular sieve of novel structure.

Specifically, the present invention relates to the following aspects.

1. An Al-SBA-15 molecular sieve, wherein the pore distribution comprises: the pore volume of the pores having a pore diameter of <4 nm is 20% or less, preferably 15% or less of the total pore volume; in the molecular sieve, the ratio of the B acid to the L acid is 1 or less.

2. The molecular sieve according to any of the above-mentioned or the afterward-mentioned aspects, which is characterized in that in the molecular sieve, the ratio of the B acid to the L acid is 0.8 or less, further 0.5 or less, still further 0.4 or less; in the molecular sieve the ratio of the B acid to the L acid is 0.1 or more, further 0.2 or more.

3. The molecular sieve according to any of the above-mentioned or the afterward-mentioned aspects, which is characterized in that in the molecular sieve, the acid amount of the mid-strong acid is 0.6-1.0 mL/g, preferably 0.7-0.9 mL/g.

4. The molecular sieve according to any of the above-mentioned or the afterward-mentioned aspects, which is characterized in that in the molecular sieve, the mass content of alumina is 2%-85%, preferably 5%-82%.

5. The molecular sieve according to any of the above-mentioned or the afterward-mentioned aspects, which is characterized in that the pore distribution of the molecular sieve also comprises: the pore volume of the pores having a pore diameter of 4-15 nm is 40%-70%, preferably 45%-65%, further preferably 50%-60% of the total pore volume.

6. The molecular sieve according to any of the above-mentioned or the afterward-mentioned aspects, which is characterized in that the properties of the molecular sieve is as follows: the specific surface area is 550-850 $m^2/g$, preferably 650-750 $m^2/g$, the total pore volume is 0.7-1.3 mL/g, preferably 0.9-1.2 mL/g.

7. A process for preparing the molecular sieve according to any of the above-mentioned or the afterward-mentioned aspects, which comprises: an amorphous silica alumina dry gel is used as feedstock, and a P123 triblock copolymer is used as template agent to synthesize an Al-SBA-15 molecular sieve.

8. The process according to any of the above-mentioned or the afterward-mentioned aspects, which is characterized in that the properties of said amorphous silica alumina dry gel are as follows: the specific surface area is 400-650 $m^2/g$, the pore volume is 0.52-1.8 mL/g, the pore distribution is as follows: the pore volume having a pore diameter of 4-15 nm is 85%-95% of the total pore volume, the pore volume having a pore diameter of >15 nm is 5% or less of the total pore volume.

9. The process according to any of the above-mentioned or the afterward-mentioned aspects, which is characterized in that the process for preparing said Al-SBA-15 molecular sieve comprises:
   (1) mixing the amorphous silica-alumina dry gel and water to form a slurry;
   (2) formulating an acidic solution containing a P123 triblock copolymer;
   (3) mixing the slurry prepared in step (1) and the acidic solution containing a P123 triblock copolymer formulated in step (2) and crystallizing to produce an Al-SBA-15 molecular sieve.

10. The process according to any of the above-mentioned or the afterward-mentioned aspects, which is characterized in that in step (1) the mass ratio of the amorphous silica alumina dry gel to water is 10:90-30:70, preferably 15:85-25:75.

11. The process according to any of the above-mentioned or the afterward-mentioned aspects, which is characterized in that in step (2) the pH of said acidic aqueous solution is 1-5, preferably 1.2-2.3, in said acidic aqueous solution, the mass content of the P123 triblock copolymer is 0.5%-5.0%, preferably 0.8%-2.8%.

12. The process according to any of the above-mentioned or the afterward-mentioned aspects, which is characterized in that in step (2) the P123 triblock copolymer is added to a diluted acid, the concentration of the diluted acid solution (as $H^+$) is 0.05-0.3 mol/L, preferably 0.1-0.2 mol/L; in step (2), the temperature of the system is controlled at 10-60° C., preferably 20-40° C.

13. The process according to any of the above-mentioned or the afterward-mentioned aspects, which is characterized in that in step (3) mixing the slurry prepared in step (1) with the acidic aqueous solution containing a P123 triblock copolymer formulated in step (2), the slurry prepared in step (1) and the acidic aqueous solution containing a P123 triblock copolymer formulated in step (2) are in such amounts that in the mixed system the mass ratio of to the P123 triblock copolymer to the amorphous silica alumina is 0.5:1-5:1, preferably 1:1-5:1.

14. The process according to any of the above-mentioned or the afterward-mentioned aspects, which is characterized in that in step (3), the crystallization temperature is 80-120° C., preferably 90-110° C.; the crystallization time is 10-35 hours, preferably 16-24 hours; the pH in the crystallization process is controlled at 2.0-5.0, preferably 3.2-4.8.

15. a catalyst composition, which comprising an Al-SBA-15 molecular sieve according to any of the above-mentioned or the afterward-mentioned aspects, or an Al-SBA-15 molecular sieve prepared with the process according to any of the above-mentioned or the afterward-mentioned aspects.

In addition, the present invention also relates to the following aspects.

1. A DLM-1 molecular sieve, which is an Al-SBA-15 molecular sieve and has a schematic chemical composition as represented by the formula "first oxide*second oxide", wherein said first oxide is silica, said second oxide is alumina, the content by mass percent of alumina in said schematic chemical composition is 10% or more (preferably 15% or more, 17% or more, 20% or more, 25% or more or 30% or more), and is 85% or less (preferably 82% or less, 75% or less, 65% or less, or 55% or less).

2. The molecular sieve according to any of the above-mentioned or the afterward-mentioned aspects, wherein in the molecular sieve, the amount of B acid is 0.01-0.50 mL/g (preferably 0.05-0.20 mL/g or 0.09-0.16 mL/g), and/or, the amount of L acid is 0.10-0.90 mL/g (preferably 0.30-0.60 mL/g or 0.39-0.46 mL/g), and/or, the ratio of the B acid to the L acid is 1 or less, preferably 0.8 or less, further preferably 0.5 or less, still further preferably 0.4 or less, and the ratio of the B acid to the L acid is 0.1 or more, preferably 0.2 or more.

3. The molecular sieve according to any of the above-mentioned or the afterward-mentioned aspects, wherein the pore distribution of said molecular sieve comprises: the pore volume of the pores having a pore diameter of <4 nm is 20% or less, preferably 15% or less of the total pore volume, preferably the pore distribution of the molecular sieve also comprises: the pore volume of the pores having a pore diameter of 4-15 nm is 40%-70%, preferably 45%-65%, further preferably 50%-60% of the total pore volume.

4. The molecular sieve according to any of the above-mentioned or the afterward-mentioned aspects, wherein the acid amount of the mid-strong acid of said molecular sieve is 0.6-1.0 mL/g, preferably 0.7-0.9 mL/g.

5. The molecular sieve according to any of the above-mentioned or the afterward-mentioned aspects, wherein the specific surface area of said molecular sieve is 550-850 m$^2$/g, preferably 650-750 m$^2$/g, and/or, the total pore volume of the molecular sieve is 0.7-1.3 mL/g, preferably 0.9-1.2 mL/g, and/or, the average pore diameter of the molecular sieve is 9-15 nm, preferably 10-12 nm.

6. A process for preparing a DLM-1 molecular sieve, which comprises a step of contacting an amorphous silica alumina (preferably an amorphous silica alumina dry gel) (powder), a P123 triblock copolymer and water under a crystallization condition to obtain a molecular sieve; and optionally, a step of calcining said obtained molecular sieve.

7. The process according to any of the above-mentioned or the afterward-mentioned aspects, wherein said crystallization condition at least comprises: the crystallization temperature is 80-120° C., preferably 90-110° C.; the crystallization time is 10-35 hours, preferably 16-24 hours; and the pH in the crystallization process is controlled at 2.0-5.0, preferably 3.2-4.8.

8. The process according to any of the above-mentioned or the afterward-mentioned aspects, wherein the alumina mass content of said amorphous silica alumina (dry basis) is 10% or more (preferably 15% or more, 17% or more, 20% or more, 25% or more or 30% or more), and is 85% or less (preferably 82% or less, 75% or less, 65% or less, or 55% or less), and/or, the specific surface area of said amorphous silica alumina is 400-650 m$^2$/g, preferably 450-600 m$^2$/g, and/or, the pore volume of said amorphous silica alumina is 0.52-1.8 mL/g, preferably 0.85-1.5 mL/g, and/or, the average pore diameter of said amorphous silica alumina is 6 nm to 12 nm, preferably 7 nm to 10 nm, and/or, the average particle size of said amorphous silica alumina is 15 μm to 150 μm, preferably 25 μm to 75 μm, preferably 40 μm to 60 μm, and/or, the pore distribution of said amorphous silica alumina comprises: the pore volume having a pore diameter of 4-15 nm is 85%-95% of the total pore volume, the pore volume having a pore diameter of >15 nm is 5% or less of the total pore volume, and/or, the water content of said amorphous silica alumina is 20-45 wt %, preferably 25-32 wt %, and/or, the mass ratio of said amorphous silica alumina (dry basis) to said P123 triblock copolymer is 0.5:1 to 5:1, preferably 1:1 to 5:1.

9. The process according to any of the above-mentioned or the afterward-mentioned aspects, comprising:
(1) mixing the amorphous silica alumina (powder) and water to form a slurry,
(2) formulating an acidic solution containing a P123 triblock copolymer (preferably an acidic aqueous solution), and
(3) contacting (for example mixing) the slurry and said acidic solution containing a P123 triblock copolymer under said crystallization condition to obtain the DLM-1 molecular sieve.

10. The process according to any of the above-mentioned or the afterward-mentioned aspects, wherein in step (1), the mass ratio of said amorphous silica alumina (dry basis) to water is 10:90 to 30:70, preferably 15:85 to 25:75, and/or, in step (2), the pH of said acidic solution is 1-5, preferably 1.2-2.3, the mass content of said P123 triblock copolymer in said acidic solution is 0.5% to 5.0%, preferably 0.8% to 2.8%, and/or, in step (3), the mass ratio of the slurry (on the dry basis of said amorphous silica alumina) to said acidic solution (based on said P123 triblock copolymer) is 0.5:1 to 5:1, preferably 1:1 to 5:1.

11. A molecular sieve composition, comprising the DLM-1 molecular sieve according to any of the above-mentioned or the afterward-mentioned aspects or the DLM-1 molecular sieve prepared with the preparation process according to any of the above-mentioned or the afterward-mentioned aspects, and an optional binder.

Moreover, the present invention also relates to the following aspects.

1. A process for treating an organic substance, which comprises a step of contacting said organic substance (preferably hydrocarbon oil) with the DLM-1 molecular sieve according to any of the above-mentioned or the afterward-mentioned aspects, the DLM-1 molecular sieve prepared with the preparation process according to any of the above-mentioned or the afterward-mentioned aspects, or the molecular sieve composition according to any of the above-mentioned or the afterward-mentioned aspects.

2. The treating process according to any of the above-mentioned or the afterward-mentioned aspects, wherein said treatment is selected from adsorptive separation, hydrotreatment and hydrocracking.

3. Use of the Al-SBA-15 molecular sieve according to any of the above-mentioned or the afterward-mentioned aspects, or the Al-SBA-15 molecular sieve prepared with the process according to any of the above-mentioned or the afterward-mentioned aspects, or the catalyst composition according to any of the above-mentioned or the afterward-mentioned aspects in the hydrogenation catalyst.

Technical Effect

Compared with the prior art, the present invention can realize at least one of the following technical effects, preferably all the technical effects.

(1) The DLM-1 molecular sieve of the present invention has proper acidity, large pore volume and specific surface area, and concentrated pore distribution, so as to facilitate the diffusion of macromolecular reactants, and increase the carbon deposition resistance.

(2) The DLM-1 molecular sieve of the present invention is particularly suitable for the hydrodenitrogenation reaction of heavy distillate oil, and is favorable for improving the hydrodenitrogenation activity.

(3) The DLM-1 molecular sieve of the present invention belongs to a silica-alumina molecular sieve, the Al content of which can reach up to 85% and is uniformly distributed in a Si—O—Al bond form, the agglomeration of Al on the surface of the molecular sieve is substantially eliminated, and the pore channel is smooth. This is an Al-SBA-15 molecular sieve with a new structure that has not been produced in the prior art.

(4) According to the process for preparing the DLM-1 molecular sieve of the present invention, in a preferable condition, an amorphous silica-alumina dry gel is directly used as raw material, so that the Al-SBA-15 molecular sieve with the new structure can be synthesized in situ (also known as in-situ crystallization), and the molecular sieve has the advantages of adjustable aluminum content, adjustable acid content and reasonable pore distribution.

(5) According to the process for preparing the DLM-1 molecular sieve of the present invention, in a preferable condition, an amorphous silica-alumina dry gel is directly used as raw material, so that ammonia nitrogen wastewater discharge and hydrochloric acid consumption can be reduced, the technological process is shortened, and the production cost is reduced.

BRIEF DESCRIPTION OF THE DRAWINGS

The FIGURE is an XRD spectrum of the DLM-1 molecular sieve obtained in Example 1 of the present invention.

DETAILED DESCRIPTION

Reference will now be made in detail to the present embodiments of the present invention, but it should be understood that the scope of the present invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When the specification derives a material, a substance, a process, a step, a device, an element and the like with the expression such as "known to those skilled in the art", "prior art", or the anologous term, it is intended that the subject matter so derived encompasses those having been conventionally used in the art at the time of filing this application, but also includes those which may not be so commonly used at the present time, but will become known in the art as being suitable for a similar purpose.

In the context of the present specification, the determination of the alumina content and the silica content is carried out by elemental analysis.

In the context of the present specification, L acid and B acid are measured by the infrared spectrometry. The used instrument is a fourier infrared spectrometer-6700 from Nicot, US. The measurement method is as follows: 20 mg of a sample with a particle size of <200 mesh is weighed and pressed into a sheet having a diameter of 20 mm; the sheet is mounted on the sample holder of the absorption cell; 200 mg of the sample is put into the hanging cup of the instrument; the absorption cell and an absorption tube are connected; a vacuum-pumping treatment is performed, and when the vacuum degree reaches $4 \times 10^{-2}$ Pa, the temperature is increased to 500° C. and maintained for 1 hour to remove the adsorbed substances on the sample surface; the sample is cooled down to room temperature, adsorbs pyridine to the saturation, is continuously heated to 160° C. and equilibrated for 1 hour, and desorb the physically adsorbed pyridine. Then the contents of infrared total acid, B acid and L acid (acid amounts) can be obtained. The units for these acid amounts are mmol/L.

In the context of the present specification, the acid amount of the mid-strong acid is measured by the NH3-TPD method. The used instrument is the Auto-Chem II 2920 type chemical adsorption instrument from Micromeritics company. Using ammonia as the absorption and desorption medium and helium as the carrier gas, the acid contents in different desorption temperature zones are obtained by a temperature-programmed desorption and chromatographic analysis. The ammonia desorption temperature corresponding to the acid content of the mid-strong acid is 250-400° C., the unit of the acid amount is mL/g, i.e., the amount of ammonia adsorbed per gram of molecular sieve.

In the context of the present specification, the specific surface area, the pore volume and the pore distribution are measured by an ASAP2405 physical adsorption instrument. The measurement process is as follows: the sample is processed, and then analyzed and tested, wherein $N_2$ in the liquid state is used as the adsorbate, and the adsorption temperature is $-196°$ C. The specific surface area is obtained by the calculation with the BET process, and the pore volume and the pore distribution are obtained by the calculation with the BJH process.

In the context of the present specification, the average pore diameter is measured as follows: the specific surface area and the pore volume of a sample are measured by an ASAP2405 physical adsorption instrument from Micromeritics company, US, and the pore size is calculated with the specific surface area and the pore volume. $N_2$ in the liquid state is used as the adsorbate, and the adsorption temperature is $-196°$ C.

In the context of the present specification, the average particle size is measured with a Mastersizer 2000 laser particle size analysis instrument, wherein the measurement range is 0.02-2000 μm and the scanning speed is 1000 times/sec.

In the context of the present specification, the XRD measurement is performed with a D/max 2500-Type X-ray diffractometer produced by Rigaku company, and the test conditions are as follows: voltage 40 KV, current 80 mA, CuKa target being selected, incident wavelength: 0.15405 nm.

All percentages, parts, ratios, and the like referred to within this specification are by weight and pressures are gauge pressures unless explicitly indicated.

In the context of the present specification, any two or more embodiments of the present invention may be combined in any combination, and the resulting technical solution is part of the original disclosure of this specification, and is within the scope of the present invention.

(I) DLM-1 Molecular Sieve

According to one embodiment of the present invention, there is provided a DLM-1 molecular sieve. The DLM-1 molecular sieve is an SBA-15 molecular sieve with silica-alumina as skeleton, and therefore belongs to an Al-SBA-15 molecular sieve.

According to one embodiment of the present invention, said DLM-1 molecular sieve has a schematic chemical composition as represented by the formula "first oxide*second oxide", wherein said first oxide is silica, said second oxide is alumina. It is known that molecular sieves sometimes (especially immediately after synthesis) contain a certain amount of water, but the present invention does not believe that it is necessary to limit the amount of water, because the presence or absence of water does not substantially affect the XRD spectrum of the molecular sieve. In view of this, the schematic chemical composition actually represents the anhydrous chemical composition of the molecular sieve. Moreover, it is obvious that the schematic chemical composition represents the skeleton chemical composition of the molecular sieve.

According to one embodiment of the present invention, in the molecular sieve, the content by mass percent of alumina in said schematic chemical composition is generally 10% or more, preferably 15% or more, 17% or more, 20% or more, 25% or more or 30% or more. In addition, in the molecular sieve, the content by mass percent of alumina in said schematic chemical composition is generally 85% or less, preferably 82% or less, 75% or less, 65% or less, or 55% or less. Alternatively, in the molecular sieve, the content of alumina can be adjusted in a broad range, and for example can be 10%, 15%, 16%, 18%, 20%, 25%, 30%, 32%, 35%, 40%, 45%, 50%, 55%, 60%, 70%, 75% or the like.

According to one embodiment of the present invention, the X-ray diffraction spectrum of said DLM-1 molecular sieve reflects the characteristic peaks of the Al-SBA-15 molecular sieve.

According to one embodiment of the present invention, the pore distribution of said DLM-1 molecular sieve comprises: the pore volume of the pores having a pore diameter of <4 nm is 20% or less, preferably 15% or less of the total pore volume. Preferably, the pore distribution of the molecular sieve also comprises: the pore volume of the pores having a pore diameter of 4-15 nm is 40%-70%, preferably 45%-65%, further preferably 50%-60% of the total pore volume.

According to one embodiment of the present invention, in said DLM-1 molecular sieve, the ratio of the amount of B acid to the amount of L acid is generally 1 or less, preferably 0.8 or less, further preferably 0.5 or less, still further preferably 0.4 or less.

According to one embodiment of the present invention, in said DLM-1 molecular sieve, the ratio of the amount of B acid to the amount of L acid is generally 0.1 or more, preferably 0.2 or more.

According to one embodiment of the present invention, the amount of the B acid in said DLM-1 molecular sieve is generally 0.01-0.50 mL/g, preferably 0.05-0.20 mL/g, preferably 0.09-0.16 mL/g.

According to one embodiment of the present invention, the amount of the L acid in said DLM-1 molecular sieve is generally 0.10-0.90 mL/g, preferably 0.30-0.60 mL/g, preferably 0.39-0.46 mL/g.

According to one embodiment of the present invention, the acid amount of the mid-strong acid in said DLM-1 molecular sieve is generally 0.6-1.0 mL/g, preferably 0.7-0.9 mL/g.

According to one embodiment of the present invention, the specific surface area of said DLM-1 molecular sieve is generally 550-850 $m^2/g$, preferably 650-750 $m^2/g$.

According to one embodiment of the present invention, the total pore volume of said DLM-1 molecular sieve is generally 0.7-1.3 mL/g, preferably 0.9-1.2 mL/g.

According to one embodiment of the present invention, the average pore size of said DLM-1 molecular sieve is generally 9-15 nm, preferably 10-12 nm.

(II) Process for Preparing the DLM-1 Molecular Sieve

The above-mentioned DLM-1 molecular sieve of the present invention can be prepared by the preparation process described below in the present specification.

According to one embodiment of the present invention, the process for preparing the DLM-1 molecular sieve comprises a step of contacting an amorphous silica alumina, a P123 triblock copolymer and water under a crystallization condition to obtain a molecular sieve.

According to one embodiment of the present invention, said amorphous silica alumina is a powder of mixed oxides of silicon and aluminum, in an amorphous form. In addition, said amorphous silica alumina powder can also be mixed with a liquid such as water in any desired ratio to form a slurry.

According to the present invention, as the raw material for preparing the molecular sieve, the amorphous silica alumina (a silica-alumina source) is directly used in a powder form (including a granular form), and the powder is converted in situ (crystallized in situ) into the DLM-1 molecular sieve, which is completely different from the prior art that provides a silica source/alumina source (particularly, an alumina source) as the raw material for preparing the molecular sieve in a solution form (or after being converted into a solution form).

According to one embodiment of the present invention, the P123 triblock copolymer is a polyoxyethylene-polyoxypropylene-polyoxyethylene copolymer (commercially available from Aldrich, Ma is about 5800). The schematic molecular formula of the P123 triblock copolymer is generally $EO_{20}PO_{70}EO_{20}$ or a similar structure thereof, and functions as a template agent in the present invention.

According to one embodiment of the present invention, in the process for preparing the DLM-1 molecular sieve, as the crystallization conditions, the crystallization temperature is generally 80-120° C., preferably 90-110° C.

According to one embodiment of the present invention, in the process for preparing the DLM-1 molecular sieve, as the crystallization conditions, the crystallization time is generally 10-35 hours, preferably 16-24 hours.

According to one embodiment of the present invention, in the process for preparing the DLM-1 molecular sieve, the pH in the crystallization process is generally controlled at 2.0-5.0, preferably 3.2-4.8.

According to one embodiment of the present invention, in the process for preparing the DLM-1 molecular sieve, the alumina mass content of said amorphous silica alumina (dry basis) is generally 10% or more, preferably 15% or more, 17% or more, 20% or more, 25% or more or 30% or more. In addition, the alumina mass content of said amorphous silica alumina (dry basis) is generally 85% or less, preferably 82% or less, 75% or less, 65% or less, or 55% or less. Alternatively, the mass content of alumina can be adjusted in a broad range, and for example can be 10%, 15%, 16%, 18%, 20%, 25%, 30%, 32%, 35%, 40%, 45%, 50%, 55%, 60%, 70%, 75% or the like.

According to one embodiment of the present invention, in the process for preparing the DLM-1 molecular sieve, the specific surface area of said amorphous silica alumina is generally 400-650 $m^2/g$, preferably 450-600 $m^2/g$.

According to one embodiment of the present invention, in the process for preparing the DLM-1 molecular sieve, the pore volume of said amorphous silica alumina is generally 0.52-1.8 mL/g, preferably 0.85-1.5 mL/g.

According to one embodiment of the present invention, in the process for preparing the DLM-1 molecular sieve, the average pore size of said amorphous silica alumina is generally 6 nm to 12 nm, preferably 7 nm to 10 nm.

According to one embodiment of the present invention, in the process for preparing the DLM-1 molecular sieve, the average particle size of said amorphous silica alumina is generally 15 μm to 150 μm, preferably 25 μm to 75 μm, preferably 40 μm to 60 μm.

According to one embodiment of the present invention, in the process for preparing the DLM-1 molecular sieve, the pore distribution of said amorphous silica alumina generally comprises: the pore volume of pores having the diameter of 4-15 nm is 85%-95% of the total pore volume, and the pore volume of pores having the diameter of >15 nm is 5% or less of the total pore volume.

According to one embodiment of the present invention, in the process for preparing the DLM-1 molecular sieve, the mass ratio of said amorphous silica alumina (dry basis) to said P123 triblock copolymer is generally 0.5:1 to 5:1, preferably 1:1 to 5:1.

According to one embodiment of the present invention, the process for preparing the DLM-1 molecular sieve specifically comprises the steps of:

(1) mixing the amorphous silica alumina (powder) and water to form a slurry,
(2) formulating an acidic solution containing a P123 triblock copolymer, and
(3) contacting (for example mixing) the slurry and said acidic solution containing a P123 triblock copolymer under said crystallization condition to obtain the DLM-1 molecular sieve.

According to one embodiment of the present invention, in step (1), the mass ratio of said amorphous silica alumina (dry basis) to water is generally 10:90 to 30:70, preferably 15:85 to 25:75.

According to one embodiment of the present invention, in step (2), the pH of said acidic solution is generally 1-5, preferably 1.2-2.3. Herein, as said acidic solution, an acidic aqueous solution can be particularly enumerated.

According to one embodiment of the present invention, in step (2), in said acidic solution or in said acidic aqueous solution, the mass content of said P123 triblock copolymer is generally 0.5% to 5.0%, preferably 0.8% to 2.8%.

According to one embodiment of the present invention, in step (2), the P123 triblock copolymer is added to a diluted acid (for example, a diluted hydrochloric acid). As an example, the concentration of said diluted acid solution (as $H^+$) is generally 0.05-0.3 mol/L, preferably 0.1-0.2 mol/L, further preferably 0.13-0.18 mol/L. Herein, in order to sufficiently dissolve the P123 triblock copolymer, it is preferable to control the temperature of the reaction system to 10-60° C., preferably 20-40° C., and further preferably 25-35° C.

According to one embodiment of the present invention, in step (3), the slurry and said acidic aqueous solution containing a P123 triblock copolymer are mixed, and the amounts of the slurry and said acidic aqueous solution containing a P123 triblock copolymer are such that the mass ratio of the P123 triblock copolymer to the amorphous silica alumina in the mixed system is 0.5:1 to 5:1, preferably 1:1 to 5:1, further preferably 1:1 to 3:1. In other words, in step (3), the mass ratio of the slurry (on the dry basis of said amorphous silica alumina) to said acidic solution (based on said P123 triblock copolymer) is generally 0.5:1 to 5:1, preferably 1:1 to 5:1, further preferably 1:1 to 3:1.

According to one embodiment of the present invention, after finishing the crystallization step of step (3), the DLM-1 molecular sieve can be separated from the obtained mixture by any conventionally known means, for example at least one step of filtering, washing, drying and the like. Specifically, for example, the filtering may be performed through the suction filtering, the washing may be performed by using deionized water as a washing solution, and the drying may be performed at 80-150° C., preferably 90-130° C. for 2-12 hours, preferably 3-6 hours. The drying may be performed under an ordinary pressure.

According to one embodiment of the present invention, as an optional step, the process for preparing the DLM-1 molecular sieve may further comprise a step of calcining said obtained molecular sieve to remove the template agent and possibly water and the like. For this purpose, the calcining may be performed in any manner conventionally known in the art, for example the calcining temperature is generally 450-600° C., preferably 480-580° C., further preferably 500-560° C., and the calcining time is 2-10 hours, preferably 3-6 hours. In addition, the calcining is generally carried out in an oxygen-containing atmosphere, such as air or an oxygen atmosphere.

According to one embodiment of the present invention, in the process for preparing the DLM-1 molecular sieve, as said amorphous silica alumina, an amorphous silica alumina dry gel is preferable. Herein, the so-called "dry gel" refers to an amorphous silica-alumina having a water content of 50 wt % or less. For example, the water content of said amorphous silica alumina dry gel is generally 20-45 wt %, preferably 25-32 wt %.

According to one embodiment of the present invention, the average particle size of said amorphous silica alumina dry gel is generally 15 μm to 150 μm, preferably 25 μm to 75 μm, preferably 40 μm to 60 μm.

According to one embodiment of the present invention, the amorphous silica alumina dry gel may be prepared by using a carbonization method. As the carbonization method, the following steps may be specifically included.

Step a: respectively formulating a sodium aluminate solution and a sodium silicate solution.

Step b: adding a part of or all of the sodium silicate solution into the sodium aluminate solution, then introducing a $CO_2$ gas, controlling the reaction temperature to be 10-40° C., preferably 15-35° C., and controlling the pH value of the gel formation to be 8-11; wherein when the introduced $CO_2$ gas comprises 40-100%, preferably 50-80% of the total introduction amount, introducing the residual sodium silicate solution.

Step c: ventilating and stabilizing the mixture for 10-30 minutes at the controlled temperature and the pH value of step b.

Step d: filtering the solid-liquid mixture obtained in step c, and washing the filter cake.

Step e: adding water into the filter cake obtained in step d and vigorously stirring, then performing the hydrothermal treatment, filtering and drying to obtain the amorphous silica alumina dry gel. Herein, the hydrothermal treatment conditions include, for example: treating at 120-150° C. under a water vapor pressure of 0.5-4.0 MPa for 2-10 hours.

According to one embodiment of the present invention, in said step a), the concentration of the sodium aluminate solution is 15-55 g $Al_2O_3$/L, and further can be 15-35 g $Al_2O_3$/L, the concentration of the sodium silicate solution is 50-200 g $SiO_2$/L, and further can be 50-150 g $SiO_2$/L.

According to one embodiment of the present invention, in said step b, a part of or all of the sodium silicate solution is added, i.e., 5-100 wt % of the total of the sodium silicate solution is added. The concentration of the $CO_2$ gas is 30-60 v %. The aeration-agitation is performed during the gel formation of step b.

According to one embodiment of the present invention, the step b may be performed in one or a combination of the following manners: (1) adding all sodium silicate into sodium aluminate, and introducing the $CO_2$ gas; (2) adding a part of sodium silicate into sodium aluminate, introducing all of the $CO_2$ gas, and then adding the remaining sodium silicate solution into the mixture; (3) adding a part of sodium silicate into sodium aluminate, then introducing a part of $CO_2$ gas, and then adding the remaining sodium silicate solution while introducing the $CO_2$ gas.

According to one embodiment of the present invention, the slurry obtained in step d is filtered and washed to near neutrality with deionized water at 50-95° C.

According to one embodiment of the present invention, water is added to the filter cake obtained in step e according to a solid-liquid volume ratio of 8:1-12:1 and vigorously stirred.

According to one embodiment of the present invention, the drying in step e may be performed by a conventional method, and may be performed at 110-130° C. for 6-8 hours.

(III) Use of the DLM-1 Molecular Sieve

The DLM-1 molecular sieve provided by the present invention can be used in any physical form, for example in form of powder, granule or molded product (for example, strip-shaped, trefoil-shaped, and the like). These physical forms can be obtained in any manner conventionally known in the art, and are not particularly limited.

According to one embodiment of the present invention, it also relates to a molecular sieve composition, containing the aforementioned DLM-1 molecular sieve, or the DLM-1 molecular sieve prepared according to the aforementioned process for preparing the DLM-1 molecular sieve. In addition, the molecular sieve composition may further contain other materials, such as at least one selected from active materials and inactive materials, particularly inactive materials. Therefore, the active material may be other molecular sieves, amorphous silica-alumina, macroporous alumina, and the like, or may be an active metal component. In addition, as the inactive material (generally referred to as a binder), it may be clay, alumina, silica gel, and the like. These other materials can be used alone, or some of these are used in combination in any ratio. As the used amount of said other materials, the conventional used amount in the art can be referred to, and there is no special limitation in this regard.

According to one embodiment of the present invention, the present invention further relates to a method for treating an organic substance, comprising a step of contacting the organic substance with the DLM-1 molecular sieve as described above, the DLM-1 molecular sieve prepared by the preparation process as described above, or the molecular sieve composition as described above. Herein, as the treatment, for example, the adsorptive separation and the conversion reaction can be enumerated. In addition, as the organic substance, hydrocarbon oils, particularly heavy distillate oils, can be particularly enumerated.

According to one embodiment of the present invention, the molecular sieve or the molecular sieve composition of the present invention is particularly suitable for use as an adsorbent for the adsorptive separation, for example, to separate at least one component from a mixture of multiple components in the gas or liquid phase.

According to one embodiment of the present invention, the molecular sieve or the molecular sieve composition of the present invention is particularly suitable as a catalyst or as an active component of a catalyst in a conversion reaction of hydrocarbon oil. The example of the conversion reaction of hydrocarbon oil includes the hydrotreatment, the hydrocracking and the like. Herein, as the hydrocarbon oil, particularly heavy distillate oil, is mentioned.

According to one embodiment of the present invention, as the reaction condition of said hydrotreatment, for example, the following can be enumerated: the total reaction pressure: 3.0 MPa to 18.0 MPa, the liquid hourly volume space velocity: 0.2 $h^{-1}$ to 4.0 $h^{-1}$, the hydrogen/oil volume ratio: 200:1-2000:1, and the reaction temperature: 230° C. to 430° C.

According to one embodiment of the present invention, as the reaction condition of said hydrocracking, for example, the following can be enumerated: the total reaction pressure: 8.0 MPa to 18.0 MPa, the liquid hourly volume space velocity: 0.2 $h^{-1}$ to 4.0 $h^{-1}$, the hydrogen/oil volume ratio: 500:1-2000:1, and the reaction temperature: 280° C. to 440° C.

According to one embodiment of the present invention, the molecular sieve of the present invention or the molecular sieve composition of the present invention are particularly suitable for use as a support or a support component for a catalyst and upon which an active component is supported in any manner conventionally known in the art, such as by solution impregnation. These active components include, but are not limited to, active metal components (including Ni, Co, Mo, W, Cu, or the like), active inorganic auxiliaries (for example F, P, and the like), and organic compounds (for example, organic acids, organic amines, and the like), and the like. These active components can be used alone, or some of these are used in combination in any ratio. As the used amount of said active components, the conventional used amount in the art can be directly referred to, and there is no special limitation in this regard.

EXAMPLES

The present invention will be described in further detail with reference to examples, but the present invention is not limited to these examples.

In the following examples and co MParative examples, all the agents and raw materials are either commercially available or can be prepared according to the prior knowledge.

Example 1

(1) An amorphous silica-alumina dry gel Al and a slurry were prepared with a sodium aluminate solution having a concentration of 20 g $Al_2O_3$/L and a sodium silicate solution having a concentration of 100 g $SiO_2$/L, by putting 0.25 L of the sodium aluminate solution into a gel forming tank, then adding 0.35 L of the sodium silicate solution, controlling the reaction temperature at 20° C., introducing a $CO_2$ gas having a concentration of 40 v %, when the introduced $CO_2$ gas comprised 50% of the total introduction amount, introducing 0.50 L of the sodium silicate solution while introducing the gas, controlling the pH value of the gel formation at 9.5, then ventilating and stabilizing for 20 minutes, filtering the slurry and washing with 65° C. deionized water to be neutral, adding water into the filter cake according to the solid/liquid volume ratio of 10:1 and vigorously stirring, treating for 2 hours at 130° C. under a water vapor pressure of 3.5 MPa, drying for 6 hours at 120° C., crushing and sieving to obtain the amorphous silica-alumina product A1. Properties of the amorphous silica alumina dry gel A1 was shown in Table 1. The prepared amorphous silica alumina A1 was mixed with deionized water and vigorously stirred to form a slurry; wherein the mass ratio of the amorphous silica alumina dry gel to water was 20:80;

(2) An acidic aqueous solution containing a P123 triblock copolymer was formulated by adding the P123 triblock copolymer into a diluted hydrochloric acid solution, wherein the diluted hydrochloric acid solution had a concentration of 0.13 mol/L, the acidic aqueous solution containing a P123 triblock copolymer had a pH of 1.2, the temperature of the acidic aqueous solution containing a P123 triblock copolymer was 25° C., and the mass content of the P123 triblock copolymer in the acidic aqueous solution containing a P123 triblock copolymer was 1.5 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-1, the mass ratio of the P123 triblock copolymer to the amorphous silica alumina in the mixed system was 1.2:1, the crystallization temperature was 90° C., the crystallization time was 20 h; the pH in the crystallization process was controlled at 3.3, the drying temperature was controlled at 100° C., the drying time was 3 h, the calcining temperature was controlled at 550° C., the calcining time was 3 h.

The XRD spectrum of the DLM-1 molecular sieve prepared in Example 1 was shown in the FIGURE, which showed characteristic peaks of the Al-SBA-15 molecular sieve.

Example 2

(1) An amorphous silica-alumina dry gel A2 and a slurry were prepared with a sodium aluminate solution having a concentration of 25 g $Al_2O_3$/L and a sodium silicate solution having a concentration of 50 g $SiO_2$/L, by putting 0.4 L of the sodium aluminate solution into a gel forming tank, then adding 0.6 L of the sodium silicate solution, controlling the reaction temperature at 22° C., introducing a $CO_2$ gas having a concentration of 35 v %, when the introduced $CO_2$ gas comprised 50% of the total introduction amount, introducing 0.2 L of the sodium silicate solution while introducing the gas, controlling the pH value of the gel formation at 9.5, then ventilating and stabilizing for 20 minutes, filtering the slurry and washing with 75° C. deionized water to be neutral, adding water into the filter cake according to the solid/liquid volume ratio of 8:1 and vigorously stirring, treating for 2 hours at 120° C. under a water vapor pressure of 3.0 MPa, drying for 8 hours at 120° C., crushing and sieving to obtain the amorphous silica-alumina product A2, the properties of which were shown in Table 1. The prepared amorphous silica alumina A2 was mixed with deionized water and vigorously stirred to form a slurry; wherein the mass ratio of the amorphous silica alumina dry gel to water was 22:78;

(2) An acidic aqueous solution containing a P123 triblock copolymer was formulated by adding the P123 triblock copolymer into a diluted hydrochloric acid solution, wherein the diluted hydrochloric acid solution had a concentration of 0.15 mol/L, the acidic aqueous solution containing a P123 triblock copolymer had a pH of 1.4, the temperature of the acidic aqueous solution containing a P123 triblock copolymer was 28° C., and the content of the P123 triblock copolymer in the acidic aqueous solution containing a P123 triblock copolymer was 1.8 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-2, the mass ratio of the P123 triblock copolymer to the amorphous silica alumina in the mixed system was 1.7:1, the crystallization temperature was 100° C., the crystallization time was 22 h; the pH in the crystallization process was controlled at 3.5, the drying temperature was controlled at 110° C., the drying time was 4 h, the calcining temperature was controlled at 520° C., the calcining time was 3.5 h.

Example 3

(1) An amorphous silica alumina dry gel A3 and a slurry were prepared with a sodium aluminate solution having a concentration of 20 g $Al_2O_3$/L and a sodium silicate solution having a concentration of 75 g $SiO_2$/L, by putting 1.25 L of the sodium aluminate solution into a gel forming tank, then adding 0.5 L of the sodium silicate solution, controlling the reaction temperature at 22° C., introducing a $CO_2$ gas having a concentration of 52 v %, when the pH reached 9.8, the introduction of the $CO_2$ gas was stopped, then ventilating and stabilizing for 20 minutes, washing to be neutral, adding water into the filter cake according to the solid/liquid volume ratio of 9:1 and vigorously stirring, treating for 3 hours at 130° C. under a water vapor pressure of 3.9 MPa, drying for 8 hours at 130° C., crushing and sieving to obtain the amorphous silica-alumina product A3. Properties of the amorphous silica alumina dry gel A3 was shown in Table 1. The prepared amorphous silica alumina A3 was mixed with deionized water and vigorously stirred to form a slurry; wherein the mass ratio of the amorphous silica alumina dry gel to water was 25:75;

(2) An acidic solution containing a P123 triblock copolymer was formulated by adding the P123 triblock copolymer into a diluted hydrochloric acid solution, wherein the diluted hydrochloric acid solution had a concentration of 0.16 mol/L, the acidic aqueous solution containing a P123 triblock copolymer had a pH of 1.8, the temperature of the acidic aqueous solution containing a P123 triblock copolymer was 33° C., and the content of the P123 triblock copolymer in the acidic aqueous solution containing a P123 triblock copolymer was 2.0 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-3, the mass ratio of the P123 triblock copolymer to the amorphous silica alumina in the mixed system was 2:1, the crystallization temperature was 93° C., the crystallization time was 18 h; the pH in the crystallization process was controlled at 4.1, the drying temperature was controlled at 120° C., the drying time was 4 h, the calcining temperature was controlled at 530° C., the calcining time was 5 h.

Example 4

(1) An amorphous silica alumina dry gel A4 and a slurry were prepared with a sodium aluminate solution having a concentration of 28 g $Al_2O_3$/L and a sodium silicate solution having a concentration of 90 g $SiO_2$/L, by putting 0.85 L of the sodium aluminate solution into a gel forming tank, then adding 0.58 L of the sodium silicate solution, controlling the reaction temperature at 35° C., introducing a $CO_2$ gas having a concentration of 60 v %, when the pH reached 9.5, the introduction of the $CO_2$ gas was stopped, then ventilating and stabilizing for 20 minutes, washing to be neutral, adding water into the filter cake according to the solid/liquid volume ratio of 8:1 and vigorously stirring, treating for 2.5 hours at 130° C. under a water vapor pressure of 3.2 MPa, drying for 8 hours at 130° C., crushing and sieving to obtain the amorphous silica-alumina product A4. Properties of the amorphous silica alumina dry gel A4 was shown in Table 1. The prepared amorphous silica alumina A4 was mixed with deionized water and vigorously stirred to form a slurry; wherein the mass ratio of the amorphous silica alumina dry gel to water was 18:82;

(2) An acidic aqueous solution containing a P123 triblock copolymer was formulated by adding the P123 triblock copolymer into a diluted hydrochloric acid solution, wherein the diluted hydrochloric acid solution had a concentration of 0.16 mol/L, the acidic aqueous solution containing a P123 triblock copolymer had a pH of 1.8, the temperature of the acidic aqueous solution containing a P123 triblock copolymer was 33° C., and the content of the P123 triblock copolymer in the acidic aqueous solution containing a P123 triblock copolymer was 2.2 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-4, the mass ratio of the P123 triblock copolymer to the amorphous silica alumina in the mixed system was 2.5:1, the crystallization temperature was 98° C., the crystallization time was 20 h; the pH in the crystallization process was controlled at 4.3, the drying temperature was controlled at 120° C., the drying time was 5 h, the calcining temperature was controlled at 540° C., the calcining time was 5 h.

Example 5

(1) An amorphous silica alumina dry gel A5 and a slurry were prepared with a sodium aluminate solution having a concentration of 20 g $Al_2O_3$/L and a sodium silicate solution having a concentration of 85 g $SiO_2$/L, by putting 0.75 L of the sodium aluminate solution into a gel forming tank, then adding 0.15 L of the sodium silicate solution, controlling the reaction temperature at 23° C., introducing a $CO_2$ gas having a concentration of 45 v %, the pH for the gel formation was controlled at 9.8, then ventilating and stabilizing for 20 minutes, filtering the slurry and washing with 65° C. deionized water to be neutral, adding water into the filter cake according to the solid/liquid volume ratio of 10:1 and vigorously stirring, treating for 2 hours at 130° C. under a water vapor pressure of 3.5 MPa, drying for 6 hours at 120° C., crushing and sieving to obtain the amorphous silica-alumina product A5. Properties of the amorphous silica alumina dry gel A5 was shown in Table 1. The prepared amorphous silica alumina A5 was mixed with deionized water and vigorously stirred to form a slurry; wherein the mass ratio of the amorphous silica alumina dry gel to water was 22:78;

(2) An acidic solution containing a P123 triblock copolymer was formulated by adding the P123 triblock copolymer into a diluted hydrochloric acid solution, wherein the diluted hydrochloric acid solution had a concentration of 0.14 mol/L, the acidic aqueous solution containing a P123 triblock copolymer had a pH of 1.6, the temperature of the acidic aqueous solution containing a P123 triblock copolymer was 33° C., and the mass content of the P123 triblock copolymer in the acidic aqueous solution containing a P123 triblock copolymer was 1.8 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-5, the mass ratio of the P123 triblock copolymer to the amorphous silica alumina in the mixed system was 1.5:1, the crystallization temperature was 95° C., the crystallization time was 22 h; the pH in the crystallization process was controlled at 3.4, the drying temperature was controlled at 110° C., the drying time was 4 h, the calcining temperature was controlled at 550° C., the calcining time was 3 h.

Example 6

(1) An amorphous silica alumina dry gel A6 and a slurry were prepared with a sodium aluminate solution having a concentration of 20 g $Al_2O_3$/L and a sodium silicate solution having a concentration of 55 g $SiO_2$/L, by putting 0.75 L of the sodium aluminate solution into a gel forming tank, then adding 0.15 L of the sodium silicate solution, controlling the reaction temperature at 23° C., introducing a $CO_2$ gas having a concentration of 48 v %, the pH for the gel formation was controlled at 9.3, then ventilating and stabilizing for 20 minutes, filtering the slurry and washing with 75° C. deionized water to be neutral, adding water into the filter cake according to the solid/liquid volume ratio of 11:1 and vigorously stirring, treating for 2 hours at 120° C. under a water vapor pressure of 3.5 MPa, drying for 6 hours at 120° C., crushing and sieving to obtain the amorphous silica-alumina product A6. Properties of the amorphous silica alumina dry gel A6 was shown in Table 1. The prepared amorphous silica alumina A6 was mixed with deionized water and vigorously stirred to form a slurry; wherein the mass ratio of the amorphous silica alumina dry gel to water was 24:76;

(2) An acidic solution containing a P123 triblock copolymer was formulated by adding the P123 triblock copolymer into a diluted hydrochloric acid solution, wherein the diluted hydrochloric acid solution had a concentration of 0.16 mol/L, the acidic aqueous solution containing a P123 triblock copolymer had a pH of 1.5, the temperature of the acidic aqueous solution containing a P123 triblock copolymer was 28° C., and the mass content of the P123 triblock copolymer in the acidic aqueous solution containing a P123 triblock copolymer was 2.1 wt %;

(3) The slurry prepared in step (1) was mixed with the acidic aqueous solution containing a P123 triblock copolymer formulated in step (2); and the mixture was crystallized, filtered, dried and calcined to produce a DLM-1 molecular sieve, named as A-S-6, the mass ratio of the P123 triblock copolymer to the amorphous silica alumina in the mixed system was 2.2:1, the crystallization temperature was 100° C., the crystallization time was 19 h; the pH in the crystallization process was controlled at 3.3, the drying temperature was controlled at 110° C., the drying time was 5 h, the calcining temperature was controlled at 550° C., the calcining time was 4 h.

Comparative Example 1

6.2 g of P123 was added into 600 mL of 0.18 mol/L hydrochloric acid solution. The mixture was warmed up to 26° C., and then stirred for 6 hours at constant temperature. The solution was in a transparent state after P123 was completely dissolved. 5.2 g of the Y zeolite slurry was added, and the pH was controlled at 3.3. The mixture was reacted under stirring at constant temperature for 6 hr, warmed up to 98° C., and hydrothermally crystallized for 24 hr. Then the mixture was filterred, the filter cake was washed, dried at 120° C. for 6 hours, and calcined at 550° C. for 6 hours to produce a molecular sieve, named as A-S-7, the properties of which were shown in Table 2.

Comparative Example 2

7.2 g of P123 was added into 600 mL of 0.13 mol/L hydrochloric acid solution. The mixture was warmed up to 26° C., and then stirred for 6 hours at constant temperature. The solution was in a transparent state after P123 was completely dissolved. 6 g of the beta zeolite slurry was added, and the pH was controlled at 3.7. The mixture was reacted under stirring at constant temperature for 6 hr, warmed up to 98° C., and hydrothermally crystallized for 24 hr. Then the mixture was filterred, the filter cake was washed, dried at 120° C. for 6 hours, and calcined at 550°

C. for 6 hours to produce a molecular sieve, named as A-S-8, the properties of which were shown in Table 2.

Comparative Example 3

Kaolin was calcined and activated at 700° C. for 4 hours. 12 g of calcined kaolin was weighed and impregnated in hydrochloric acid (6 mol/L) for 4 hours. Then deionized water was used, and the suction filtration was performed. The filter cake was washed to neutrality and dried. The dried sample was calcined at 900° C. for 2 hours, then put into 5 mol/L NaOH alkaline solution and reacted for 3 hours under high temperature and high pressure (the temperature was 160° C. and the pressure was 0.5 MPa). After the reaction was finished, the pH value was adjusted to 14.0. Then the resulting material was added dropwise to a mixed solution of a surfactant and hydrochloric acid (n(FSO–100)/n(P123) =5.5), wherein the hydrochloric acid concentration was 7.5 mol/L. The resulting mixture was reacted under stirring at 40° C. for 2 hours and hydrothermally reacted at 160° C. for 48 hours, and filtered. The filter cake was washed, dried, and calcined in a muffle furnace at 550° C. for 6 hours to produce a mesopore material A-S-9, the properties of which were shown in Table 2.

Comparative Example 4

4 g of P123 was added to 125 mL of 2 mol/L hydrochloric acid solution, and the mixture was stirred at 40° C. until P123 was completely dissolved; 8.5 g of ethyl orthosilicate was added to the P123-containing hydrochloric acid solution, stirred for 4 hours, aluminium nitrate was added so that the Si/Al molar ratio was 35, the stirred was continued for 20 hours. The aforementioned solution was added to a 250 mL autoclave, stirred at 100° C. for 48 hours, cooled to room temperature, and adjusted with ammonia water to the pH value of 7.5. Under the continuous stirring, the mixture was warmed up to 100° C., stirred for 72 hours, and filtered. The filter cake was washed at 60° C. overnight and calcined at 550° C. for 6 hours to produce a mesopore material A-S-10, the properties of which was shown in Table 2.

Comparative Example 5

The P123 triblock copolymer as template agent and ethyl orthosilicate as silicon source were weighed respectively, wherein the mass of the template agent P123 was 5.5 g and the mass of ethyl orthosilicate was 10.2 g; the template agent and the silicon source were added to a HCl solution (pH=2.8) and intensively stirred at 28° C. for 30 hours, the stirred mixture was allowed to stand and crystallized at 120° C. for 20 hours, washed with deionized water, and dried to produce SBA-15. The obtained SBA-15 molecular sieve was mixed with water and vigorously stirred, wherein the solid to liquid ratio was 1:10, then the hydrochloric acid solution containing 23 g of aluminium isopropoxide was added, the resulting material was warmed up to 100° C., stirred for 20 hours, and filtered. The filter cake was washed, dried at 60° C. overnight, and calcined at 550° C. for 5 hours to produce a mesopore material A-S-11, the properties of which were shown in Table 2.

Comparative Example 6

5.2 g of P123 was added into 500 mL of hydrochloric acid solution (0.13 mol/L). The mixture was warmed up to 28° C., and then stirred for 8 hours at constant temperature. After being completely dissolved, the solution was in the transparent state. The solution was added to a slurry containing 6 g of alumina and 8 g of silica sol (having a silica content of 30%), the pH was controlled at 3.5, and the mixture was reacted under stirring for 8 hours at constant temperature, warmed up to 98° C., and hydrothermally crystallized for 26 hours. Then the mixture was filterred, the filter cake was washed, dried at 120° C. for 6 hours, and calcined at 550° C. for 6 hours to produce a mesopore material A-S-12. It was known through the experimental analysis that the mesopore material A-S-12 had no structural feature of Al-SBA-15, and had no reference significance.

TABLE 1

Physical and chemical properties of amorphous silica alumina dry gel

| Item | A1 | A2 | A3 | A4 | A5 | A6 |
|---|---|---|---|---|---|---|
| Alumina content (dry basis), wt % | 12.5 | 25 | 40 | 31.31 | 54 | 64.5 |
| Average pore diameter, nm | 8 | 9 | 10 | 8 | 9 | 10 |
| Average particle size, μm | 45 | 48 | 55 | 50 | 58 | 60 |
| Water content, wt % | 28 | 25 | 30 | 31 | 30 | 28 |
| Specific surface area, m$^2$/g | 485 | 513 | 506 | 515 | 525 | 513 |
| Pore volume, mL/g | 1.32 | 1.28 | 1.30 | 1.33 | 1.28 | 1.32 |
| Pore distribution, % | | | | | | |
| 4-15 nm | 85 | 88 | 86 | 87 | 86 | 91 |
| >15 nm | 3 | 4 | 2 | 3 | 2 | 3 |

TABLE 2

Properties of molecular sieves

| Item | A-S-1 | A-S-2 | A-S-3 | A-S-4 | A-S-5 |
|---|---|---|---|---|---|
| Specific surface area, m$^2$/g | 745 | 747 | 742 | 750 | 735 |
| Alumina content, wt % | 12.5 | 25 | 40 | 31.31 | 54 |
| Pore volume, mL/g | 1.18 | 1.13 | 1.09 | 1.16 | 1.16 |
| Acid amount of mid-strong acid, mL/g | 0.75 | 0.78 | 0.82 | 0.85 | 0.77 |

TABLE 2-continued

| Properties of molecular sieves | | | | | |
|---|---|---|---|---|---|
| Amount of B acid, mL/g | 0.095 | 0.115 | 0.103 | 0.120 | 0.100 |
| Amount of L acid, mL/g | 0.404 | 0.434 | 0.427 | 0.399 | 0.415 |
| B/L | 0.235 | 0.265 | 0.243 | 0.301 | 0.243 |
| Pore distribution, % | | | | | |
| <4 nm | 11.19 | 13.03 | 12.03 | 14.35 | 10.19 |
| 4-15 nm | 54.77 | 53.89 | 52.02 | 55.36 | 55.65. |
| >15 nm | 34.04 | 33.08 | 35.95 | 30.29 | 34.16 |

| Item | A-S-6 | A-S-7 | A-S-8 | A-S-9 | A-S-10 | A-S-11 |
|---|---|---|---|---|---|---|
| Specific surface area, m²/g | 748 | 720 | 731 | 695 | 708 | 706 |
| Alumina content, wt % | 64.5 | 4 | 6 | 8 | 13 | 17.25 |
| Pore volume, mL/g | 1.15 | 0.85 | 0.91 | 0.78 | 1.05 | 1.04 |
| Acid amount of mid-strong acid, mL/g | 0.76 | 0.53 | 0.48 | 0.41 | 0.43 | 0.45 |
| Amount of B acid, mL/g | 0.106 | 0.258 | 0.299 | 0.314 | 0.309 | 0.374 |
| Amount of L acid, mL/g | 0.416 | 0.213 | 0.26 | 0.389 | 0.234 | 0.467 |
| B/L | 0.256 | 1.21 | 1.15 | 1.24 | 1.32 | 1.25 |
| Pore distribution, % | | | | | | |
| <4 nm | 12.07 | 42.69 | 48.32 | 46.28 | 45.36 | 43.05 |
| 4-15 nm | 57.25 | 38.25 | 30.67 | 35.69 | 36.45 | 37.56 |
| >15 nm | 30.68 | 19.06 | 21.01 | 18.03 | 18.19 | 19.39 |

Example 7

A hydrotreatment catalyst support and a hydrotreatment catalyst were prepared by using A-S-1 prepared in Example 1:

135 g of alumina dry glue powder (having a specific surface area of 313 m²/g, a pore volume of 1.12 mL/g and an average pore diameter of 14 nm), 9.5 g of molecular sieve A-S-1 and 4 g of *sesbania* powder were added to 115 mL of an aqueous solution containing nitric acid and citric acid (the amount of nitric acid: 8.3 g and the amount of citric acid: 3.5 g), the mixture was kneaded, rolled, extruded into strip shape, dried at 120° C. for 4 hours and calcined at 550° C. for 4 hours to obtain the final alumina support containing the molecular sieve, named as Z1.

Z1 was isometrically impregnated with an impregnation solution containing Mo, Ni and P, dried at 140° C. for 3 h, and calcined at 450° C. for 2 h to finally obtain a catalyst, named as C-1. In the catalyst C1, the content of molybdenum oxide was 22.0 wt %, the content of nickel oxide was 3.57 wt %, and the content of phosphorus oxide was 1.20 wt %.

The catalyst C-1 was subjected to a catalyst activity evaluation experiment, and specifically the experiment was performed on a 100 mL small scale hydrogenation unit, and the catalyst was pre-sulfurized before the evaluation. The catalyst evaluation conditions were as follows: the total reaction pressure was 14.5 MPa, the liquid hourly volume space velocity was 1.1 h⁻¹, the hydrogen/oil volume ratio was 750:1, and the reaction temperature was 375° C. The properties of the feedstock oil were shown in Table 3, and the results of the activity evaluation were shown in Table 4.

Example 8

A hydrotreatment catalyst support and a hydrotreatment catalyst were prepared by using A-S-3 prepared in Example 3:

125 g of alumina dry glue powder (having a specific surface area of 328 m²/g, a pore volume of 1.11 mL/g and an average pore diameter of 13.5 nm), 7.5 g of molecular sieve A-S-3 and 4 g of *sesbania* powder were added to 120 mL of an aqueous solution containing nitric acid and citric acid (the amount of nitric acid: 7.8 g and the amount of citric acid: 3.8 g), the mixture was kneaded, rolled, extruded into strip shape, dried at 120° C. for 3 hours and calcined at 550° C. for 4 hours to obtain the final alumina support containing the molecular sieve, named as Z2.

Z2 was isometrically impregnated with an impregnation solution containing Mo, Ni and P, dried at 130° C. for 3 h, and calcined at 460° C. for 3 h to finally obtain a catalyst, named as C-2. In the catalyst C2, the content of molybdenum oxide was 22.1 wt %, the content of nickel oxide was 3.45 wt %, and the content of phosphorus oxide was 1.19 wt %.

The catalyst C-2 was subjected to the catalyst activity evaluation experiment in the same manner as in Example 7. The properties of the feedstock oil were shown in Table 3, and the results of the activity evaluation were shown in Table 4.

Comparative Examples 6-10

The preparation of the support and the catalyst was the same as in Example 7 except that A-S-7 to A-S-11 prepared in Comparative Examples 1 to 5 were used instead of A-S-1 in Example 7, respectively, to obtain supports Z3 to Z7 and catalysts C-3 to C-7, respectively.

The catalyst activity evaluation experiments were performed on the catalysts C-3 to C-7 in the same manner as in Example 7. The properties of the feedstock oil were shown in Table 3, and the results of the activity evaluation were shown in Table 4.

TABLE 3

| Properties of the feedstock oil | |
|---|---|
| Feedstock oil | |
| Density (20° C.), g · cm⁻³ | 0.916 |
| Nitrogen content, μg · g⁻¹ | 1482 |
| Distillate range, ° C. | 310-540 |

TABLE 4

| Catalyst | C-1 | C-2 | C-3 | C-4 | C-5 | C-6 | C-7 |
|---|---|---|---|---|---|---|---|
| Nitrogen content, μg·g$^{-1}$ | 5.2 | 5.8 | 25.25 | 28.56 | 29.05 | 28.94 | 27.98 |

Results of the catalyst activity evaluation

As can be seen from Table 4, the hydrotreatment catalysts prepared by using the DLM-1 molecular sieve of the present invention had significantly higher denitrification activity than the catalysts of the Comparative Examples.

The invention claimed is:

1. A process for preparing a DLM-1 molecular sieve, which comprises a step of contacting an amorphous silica alumina, a P123 triblock copolymer and water under a crystallization condition to obtain a molecular sieve; and optionally, a step of calcining said obtained molecular sieve,
    step 1) mixing an amorphous silica alumina and water to form a slurry;
    step 2) formulating an acidic solution containing a P123 triblock copolymer; and
    step 3) mixing the slurry and the acidic solution containing a P123 triblock copolymer under crystallization conditions to obtain the DLM-1 molecular sieve,
    wherein in a mass ratio of the amorphous silica alumina, on a dry basis, to water is 10:90 to 30:70, in step 2), the acidic solution has a pH value of 1-5, a mass content of the P123 triblock copolymer in the acidic solution is 0.5% to 5.0%, and in step 3), a mass ratio of the slurry, on the dry basis of the amorphous silica alumina, to the acidic solution, based on said P123 triblock copolymer, is 0.5:1 to 5:1.

2. The process according to claim 1, wherein the crystallization condition at least comprises a temperature of 80-120° C., preferably 90-110° C., a time of 10-35 hours, and the pH in the crystallization process of 2.0-5.0.

3. The process according to claim 1, wherein the alumina mass content of the amorphous silica alumina, on a dry basis, is 10% or more and 85% or less, and/or, a specific surface area of the amorphous silica alumina is 400-650 m²/g, and/or,
    a pore volume of the amorphous silica alumina is 0.52-1.8 mL/g, and/or,
    a average pore diameter of the amorphous silica alumina is 6 nm to 12 nm, and/or,
    an average particle size of the amorphous silica alumina is 15 μm to 150 μm, and/or,
    a pore distribution of the amorphous silica alumina comprises: the pore volume of pores having a pore diameter of 4-15 nm is 85%-95% of the total pore volume, the pore volume of pores having a pore diameter of >15 nm is 5% or less of the total pore volume, and/or,
    a water content of an amorphous silica alumina is 20-45 wt %, and/or,
    a mass ratio of said amorphous silica alumina, on a dry basis, to the P123 triblock copolymer is 0.5:1 to 5:1.

4. The process according to claim 1, wherein the amorphous silica alumina is an amorphous silica alumina dry gel in a powder form.

5. The process according to claim 2, wherein the temperature is 90-110° C., the time is 16-24 hours, or the pH in the crystallization process is of 3.2-4.8.

6. The process according to claim 3, wherein the alumina mass content of the amorphous silica alumina, on a dry basis, is 25% or more or 30% or more and 65% or less or 55% or less, and/or, the specific surface area of the amorphous silica alumina is 450-600 m²/g, and/or, the pore volume of the amorphous silica alumina is 0.85-1.5 mL/g, and/or, the average pore diameter of the amorphous silica alumina is 7 nm to 10 nm, and/or, the average particle size of the amorphous silica alumina is 40 μm to 60 μm, and/or, the water content of the amorphous silica alumina is 25-32 wt %, and/or, the mass ratio of the amorphous silica alumina, on a dry basis, to the P123 triblock copolymer is 1:1 to 5:1.

\* \* \* \* \*